United States Patent [19]

Martin

[11] Patent Number: 5,837,881
[45] Date of Patent: Nov. 17, 1998

[54] PRESSURE GAUGE CALIBRATING DEVICE

[76] Inventor: Scott Martin, 110 Kimble St., Belle Chasse, La. 70037

[21] Appl. No.: 772,599

[22] Filed: Dec. 23, 1996

[51] Int. Cl.⁶ .................................................... G01L 27/00
[52] U.S. Cl. .............................................. 73/1.68; 73/1.66
[58] Field of Search .......................... 73/4 R, 1 R, 1.63, 73/1.64, 1.68, 1.66

[56] References Cited

U.S. PATENT DOCUMENTS

| | | | |
|---|---|---|---|
| 909,950 | 1/1909 | Schreidt | 73/4 R |
| 2,207,898 | 7/1940 | Schoenecke | 73/51 |
| 2,600,324 | 6/1952 | Rappaport | 73/4 R |
| 3,067,614 | 12/1962 | Rich | 73/398 |
| 3,164,979 | 1/1965 | Siegel | 73/4 R |
| 3,262,305 | 7/1966 | Dawley | 73/4 |
| 3,557,602 | 1/1971 | Frantz | 73/4 |
| 3,826,125 | 7/1974 | Cotton | 73/4 |
| 4,333,331 | 6/1982 | Mann | 73/4 R |
| 4,512,179 | 4/1985 | Umble et al. | 73/4 |
| 4,566,308 | 1/1986 | Powell | 73/4 |
| 4,766,765 | 8/1988 | Ezekoye | 73/168 |

Primary Examiner—Hezron E. Williams
Assistant Examiner—Nashmiya S. Fayyaz
Attorney, Agent, or Firm—Keaty & Keaty

[57] ABSTRACT

The invention relates to a pressure source calibrator which allows testing and calibrating of a pressure gauge or other device mounted in a particularly difficult-to-access area. The calibrator is lightweight, portable and operates with an external source of pressurized fluid, such as a cartridge containing pressurized fluid. A variable pressure chamber formed within the calibrator body is connected to a master gauge and to a pressure gauge to be calibrated, while pressure in the chamber is regulated by a vernier adjustment knob extending into the chamber. The calibrator provides for the use of an optional pre-pressurization process for preventing thermal instability of the pressurized fluid admitted into the calibrator body. Pre-pressurization is carried out by admitting warmer outside air into the variable pressure chamber by one or more pistons moving within one or more piston chambers.

22 Claims, 4 Drawing Sheets

PRESSURE GAUGE CALIBRATING DEVICE

BACKGROUND OF THE INVENTION

The present invention relates to measuring and testing devices, and more particularly to a device for calibrating pressure level, flow, and differential press transmitters, and indicators or gauges, switches and the like.

Pressure testing equipment is used in many industrial fields for measuring the amount of pressure existing in a closed vessel, container, a closed fluid system and the like. Some of the conventional pressure gauge testers are shown in a number of prior U.S. patents. For example, U.S. Pat. No. 2,207,898 issued on Jul. 16, 1940 discloses a device particularly adapted for a threadable attachment to a gas containing vessel. U.S. Pat. No. 3,067,614 issued on Dec. 11, 1962 discloses a device particularly suitable for use in testing a pressure gauge in a permanently sealed fluid system. This device uses a pair of valve diaphragms incorporated into the body of the tester. U.S. Pat. No. 3,262,305 issued on Jul. 26, 1966 discloses a device suitable for calibrating differential pressure transmitters, switches, water-level gauges and the like. The precision gauge is actuated by a gas supplied from a nitrogen tank. U.S. Pat. No. 3,826,125 issued on Jul. 13, 1974 discloses a device particularly suitable for testing pressure in a fire extinguisher. U.S. Pat. No. 4,512,179 issued on Apr. 23, 1985 discloses a microprocessor-operated fluid pressure test instrument where the test pressure output from the test instrument's fluid pressure supply is connected to the pressure transducer unit and the test. U.S. Pat. No. 4,566,308 issued on Jan. 28, 1986 shows a pressure tester for a fire extinguisher. U.S. Pat. No. 4,766,765 issued on Aug. 30, 1988 discloses a testing device particularly adapted for use with pressure release valves of vessels, pipelines and the like. This device incorporates a piston with a spring pack between opposing piston plates.

While the above devices function satisfactory under many circumstances, none of them shows a device which can use portable source of gas that can be conveniently transported to any location where movement of the user is particularly restricted due to height of the pressure gauge location or lack of maneuverable space. For example, in oil refineries the pressure gauge or instrument to be tested and calibrated may be on top of a column, or in a location where it is difficult to set up and use standard size calibration devices.

The present invention contemplates provision of a pressure source calibrating device that can be easily transported to any desired location, that can create a considerable amount of test pressure within a very short period of time and allow high accuracy calibration of pressure gauges.

SUMMARY OF THE INVENTION

It is, therefore, an object of the present invention to provide a pressure source calibrating device that can be used with an independent gas pressure source to create the desired pressure inside a calibrating device.

It is another object of the present invention to provide a pressure source calibrating device which incorporates a relatively large volume pressure chamber (vernier) to allow highly accurate calibration of a test gauge.

It is a further object of the present invention to provide a pressure source calibrating device that comprises a means for pre-pressurizing the pressure chamber prior to admission of a pressurized gas into the chamber to stabilize the pressure in the pressure chamber so that temperature changes are minimized.

It is still a further object of the present invention to provide a pressure gauge calibrating device that allows to change the volume inside the calibration chamber, thereby providing more flexibility for testing various equipment.

These and other objects of the present invention are achieved through a provision of a pressure gauge calibrating device which comprises a calibrator body provided with a cutout in a lower portion thereof for connecting the calibrator body to an external source of pressurized fluid, for example a cartridge containing carbon dioxide. The calibrating device is formed with a variable pressure chamber which is in fluid communication with the external source of pressurized fluid through a fluid passageway formed in the calibrator body.

A regulating valve is mounted within that passageway to allow a user to admit a predetermined amount of pressurized fluid into the calibrator body. The device is provided with a pair of connecting couplings, one of the couplings being adapted for connecting the variable pressure chamber to a master pressure gauge, the calibration of which is known, while the second coupling is adapted for connecting to a pressure gauge or other measuring instrument to be calibrated. By regulating the pressure within the variable pressure chamber, the pressure gauge can be tested against the accuracy of the master pressure gauge.

To minimize thermal instability of the pressurized fluid admitted into the calibrator body, the present invention provides for the use of pre-pressurizing means which allows admission of outside warm air into the calibrator body and into the variable pressure chamber. The pre-pressurization means comprises a pair of pistons, both carried by one piston arm and moving simultaneously within independent piston chambers. Each of the piston chambers is independently connected to the variable pressure chamber and to an exterior of the calibrator body. A handle connected to one of the pistons allows the user to manually "pump" outside air into the piston chambers, when necessary.

The pressure calibrating device is further provided with a pressure regulating means mounted within the variable pressure chamber or vernier chamber. The pressure regulating means comprises an elongated sleeve provided with an insert in each of the open ends of the sleeve, with the sleeve being slidably movable within the variable pressure chamber. An adjustment knob mounted on an exterior of the calibrator body carries an elongated screw, a free end of which threadably engages one of the inserts fitted within the sleeve. Rotation of the adjustment knob causes movement of the sleeve within the variable pressure chamber, thereby allowing to regulate pressure within that chamber from the exterior of the calibrator body.

BRIEF DESCRIPTION OF THE DRAWINGS

Reference will now be made to the drawings, wherein like parts are designated by like numerals and wherein.

DETAILED DESCRIPTION OF THE PREFERRED EMBODIMENT

Figures 6, 7:
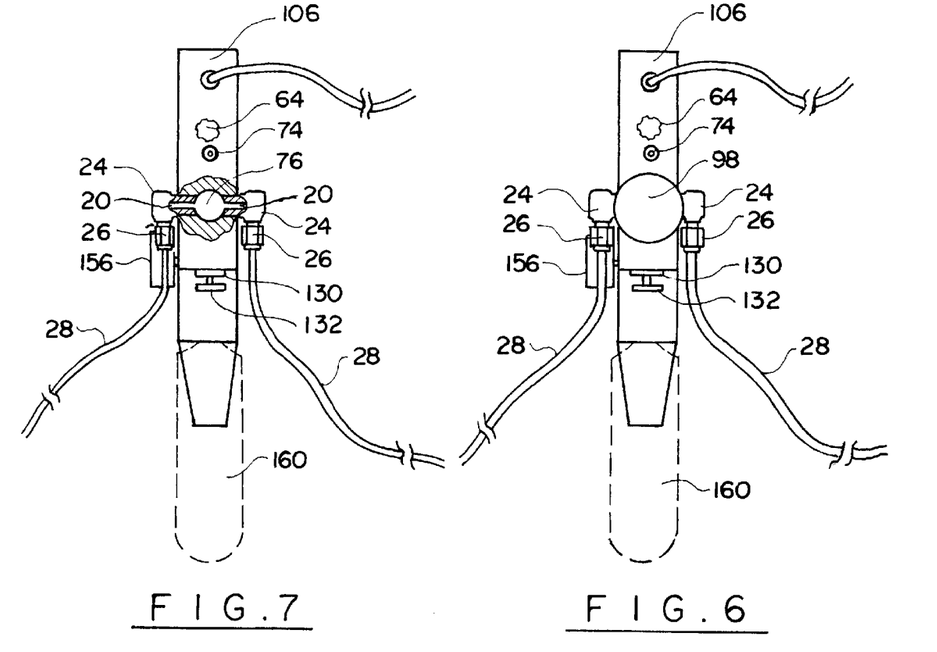
FIG. 6 is an end view of the device in accordance with the present invention, with schematically illustrated gas conduits.
FIG. 7 is an end view, partially cut away to show variable pressure chamber communicating with a master gauge and the gauge to be tested.

Turning now to the drawings in more detail, the device in accordance with the present invention is designated by numeral 10. The calibrating device 10 comprises a calibrator body 12 having an upper portion 14, a middle portion 16 and a lower portion 18. The middle portion 16 is provided with a pair of openings 20 (See FIG. 7) which are in fluid communication with a variable pressure chamber 76 formed in the body 12 and in fluid communication with a pair of pressure outlets couplings 24 secured on the opposite sides of the body 12 of FIG. 1. Each of the pressure outlet couplings 24 has a passageway extending through its body to allow fluid communication between the variable pressure chamber 76 and an exterior of the body 12.

A pair of tubing nuts 26 are detachably connected to the pressure outlet couplings 24 to allow connection of a pair of flexible hoses 28 to the respective outlet couplings 24. The conduits 28 are designed for connection to pressure gauges or other devices. One of the hoses 28 is connected to a master gauge with a known true calibration, while another hose 28 is connected to a pressure gauge or other device to be tested and calibrated during operation of the device 10.

Figure 1:
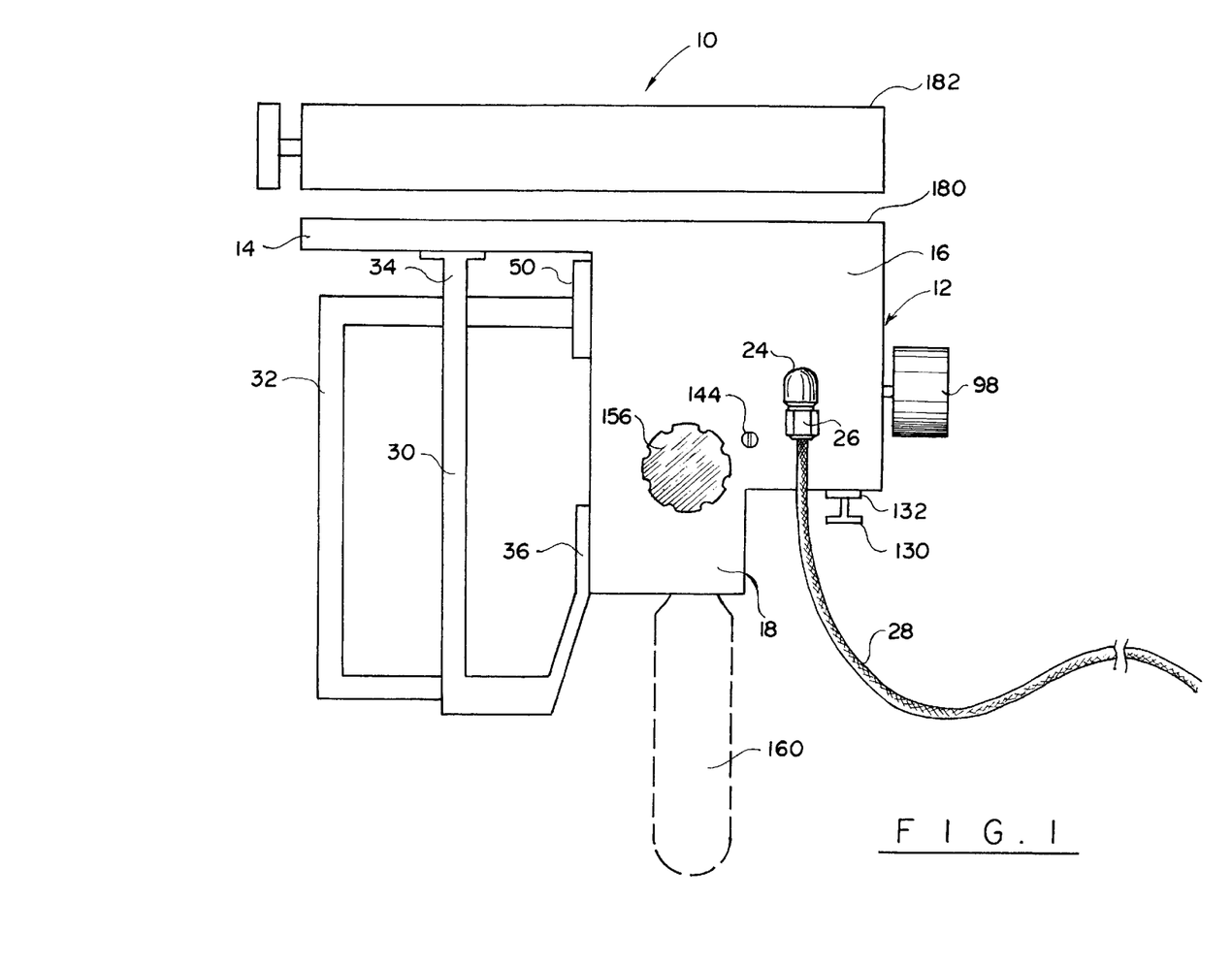
FIG. 1 is a side elevational view of the device in accordance with the present invention, with a liquified gas container shown in phantom lines.

A pair of handles 30 and 32 of FIG. 1 are secured at one end of the central portion 16, with the handle 30 being fixedly attached to an upper part 14 of the body 12 at a first end 34, and fixedly attached to the lower portion 18 of the body 12 at its opposite end 36. The handle 32 moves in relation to the handle 30 and the body 12 in response to a manual force applied to a central portion 38 (FIG. 2) of the handle 32.

Figure 2:
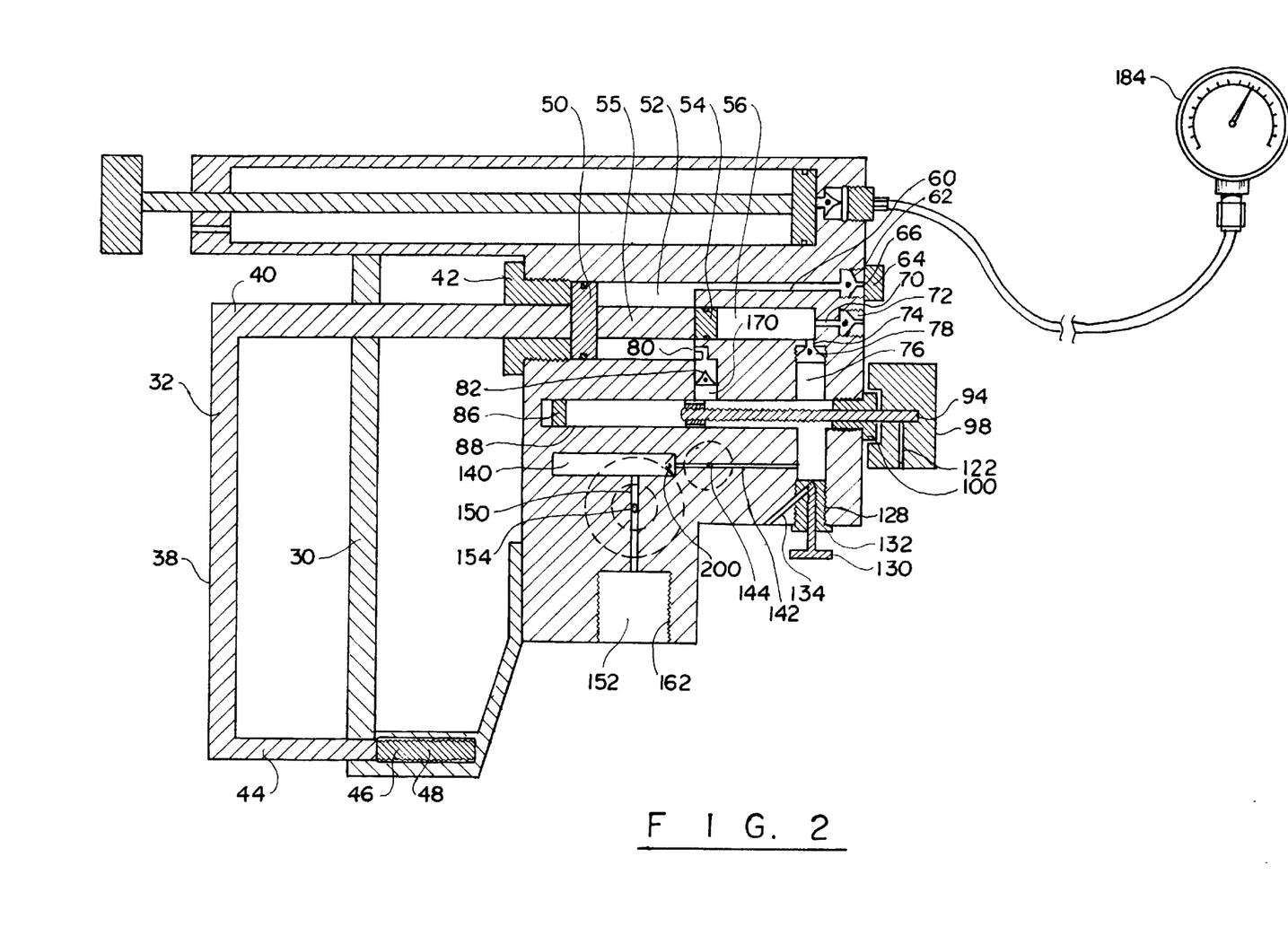
FIG. 2 is a cross sectional view of the device in accordance with the present invention.

An extension 40 of the handle 32 is oriented at an angle to the portion 38 and extends through an opening formed in a threaded nut 42 (See FIG. 2) into the body 12. A parallel extension 44 of the handle 32 extends through an opening formed in a part of the handle 30 and is continuously urged into a direction away from the body 12 by a compression spring 46. As can be seen in FIG. 2, the compression spring 46 is mounted within a chamber 48 formed in the lower part of the handle 30 and provides a guide for the lower end of the handle 32.

The extension 40 of the handle 38 carries a piston 50 which slidably moves within a chamber 52 formed within the body 12. A second piston 54 is carried by the outermost end of the extension 40, the piston 54 being adapted for a slidable movement within a chamber 56 which is formed in the body 12 in co-axial relationship with the chamber 52. The pistons 50 and 54 move simultaneously during compression of the piston handle 32 against the force of the compression spring 46. The chamber 52 communicates with an exterior of the body 12 through a passageway 60 and through a check valve 62 fitted at the inlet of the passageway 60 adjacent to an exterior of the body 12.

A screw 64 is engaged on the exterior surface of the body 12 in alignment with the check valve 62, the screw 64 carrying a pin 66 extending into a flap closing valve or, check value 62. When manually rotated, the screw 64 moves the pin 66 into a contact with the check valve 62, forcing the check valve 62 open. The check valve 62 will remain open until the screw 64 is manually rotated in the opposite direction, relieving the pressure of the pin 66 on the closure of the check valve 62.

The chamber 56 communicates with the exterior of the body 12 through a passageway 70 formed in co-alignment with a horizontal axis of the chamber 56. A check valve 72 is fitted within an enlarged portion of the passageway 70 and communicates with the exterior of the body 12 by admitting air into the chamber 56 when the piston 54 is moved away from the one-way check valve 72.

A transverse opening 74 is formed adjacent to the outlet part of the chamber 56. The opening 74 communicates with a variable pressure chamber 76 through a check valve 78. Another transverse opening 80 is formed a distance from the opening 74, the opening 80 being intermittently covered by the piston 54 during movement of the piston 54 along with the piston arm 55. A check valve 82 is mounted between the passageway 80 and the variable pressure chamber 76.

Figure 3:
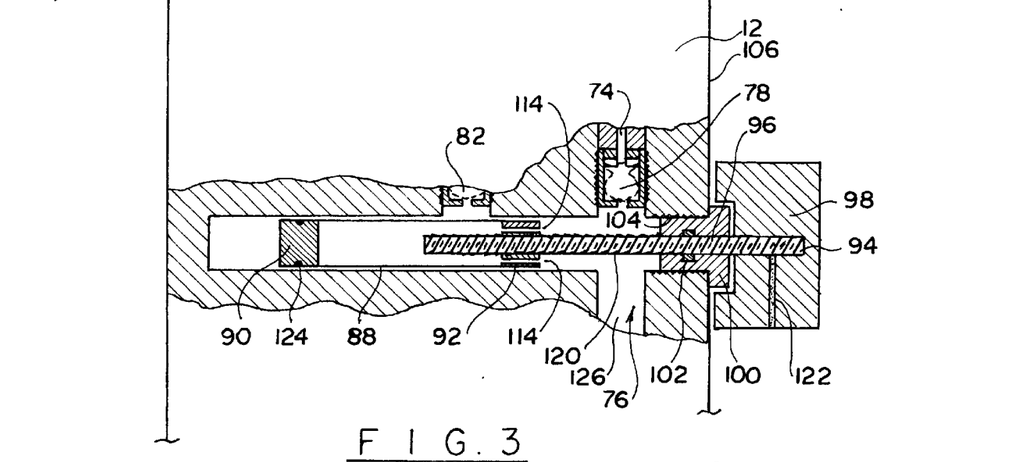
FIG. 3 is a detail, partially cut away view showing a pressure regulator means in cross section.
Figure 4:
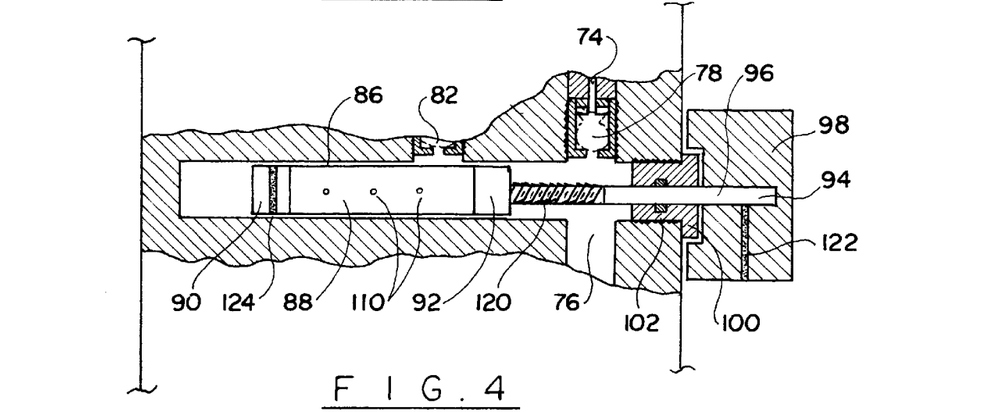
FIG. 4 is a detail, partially cut away view showing a pressure regulating piston and partial cross section of the pressure regulating adjustment knob.
Figure 5:
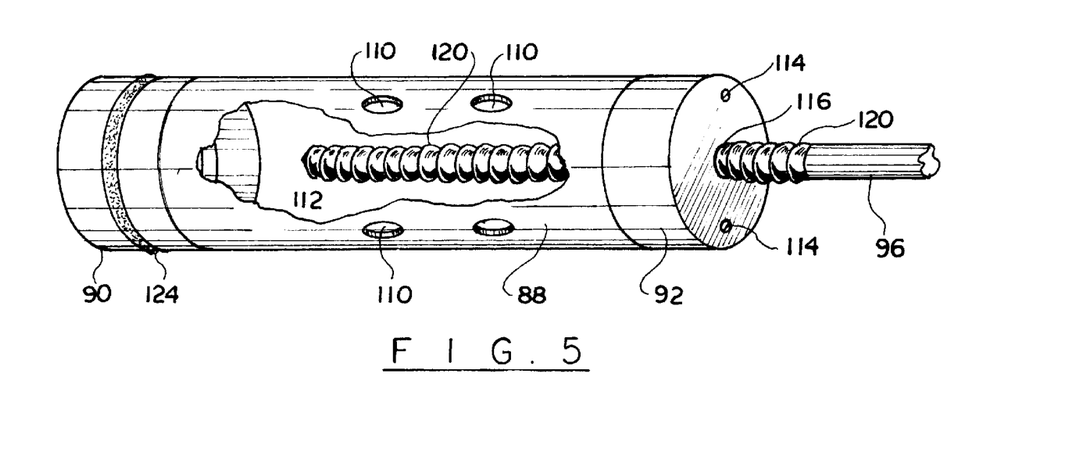
FIG. 5 is a detail, partially cut away view showing a pressure regulating device, with a partial cut away view of internal chamber.

The variable pressure chamber 76 extends through substantially entire portion 16 of the calibrator body 12. Mounted within the chamber 76 is a pressure regulating means 86 which comprises an elongated sleeve 88 having a piston 90 (FIGS. 3–5) secured at one of its ends. The pressure regulating means 86 further comprises an insert 92 fitted into the opposite end of the sleeve 88. The insert 92 has an opening, the walls of which are threaded to receive a threaded portion of a screw 94. The sleeve 88 moves within the variable pressure chamber 76 in response to rotation of the screw 94.

A non-threaded end 96 of the screw 94 is secured to a vernier adjustment knob 98, with a non-threaded portion of the screw 94 passing through a nut 100 fitted at the outermost portion of the variable pressure chamber 76. The nut 100 fits within a cutout formed in the vernier adjustment knob 98 in the manner shown in FIG. 3. A suitable sealing means, such as an O-ring 102 is fitted about the screw 94 in the area where it contacts the nut 100 to ensure a fluid-tight seal of the chamber 76. The nut 100 is threadably engaged within an opening 104 formed in an end wall 106 of the body 12.

The exterior of the cylindrical sleeve 88 is provided with at least one through opening 110 to allow fluid communication between an interior chamber 112 formed within the sleeve 88 and the interior of the variable pressure chamber 76. One or more openings 114 are formed through the sleeve 14 in fluid communication with the chambers 112 and 76. The openings 110 and 114 allow gas to move freely between the chambers 76 and 112 and ensure that the pressure inside these chambers remains equal.

A threaded opening 116 formed in the end plate of the threaded sleeve 92 allows the screw 94 to move the sleeve 92 along the length of the threaded portion 120. To facilitate rotation of the threaded portion 120 of the screw 94 within the sleeve 92, when working against high pressures, a conventional ball bearing system, or a needle bearing system can be incorporated into the nut 100, if desired.

A non-threaded portion 96 of the screw 94 is secured to the vernier adjustment knob 98 by a screw 122 fitted through the body of the knob 98 at a right angle to the screw 96. To retain the piston end 90 of the pressure regulating means 86 in a fluid-tight relationship within the sleeve 88, a sealing O-ring 124 is mounted between the interior wall of the sleeve 88 and the exterior of the piston body 90.

The variable pressure chamber 76 has a transverse portion 126, the lowermost part of which has an interior threaded wall 128. Fitted within the transverse portion 126 is a vent valve 130 (See FIG. 2) secured in place by a valve nut 132. A gas passageway 134 is formed at an angle to the transverse portion 126, such that movement of the vent valve 130 within the valve nut 132 will close the passageway 134 during pressurization of the chamber 76. When the pressure in the chamber 76 needs to be released, the vent valve, which can be a screw or a push type valve, is withdrawn, opening the passageway 134 and allowing the gas in the chamber 76 to escape to the exterior of the body 12, thereby decreasing the pressure in the chamber 76.

Figure 8:
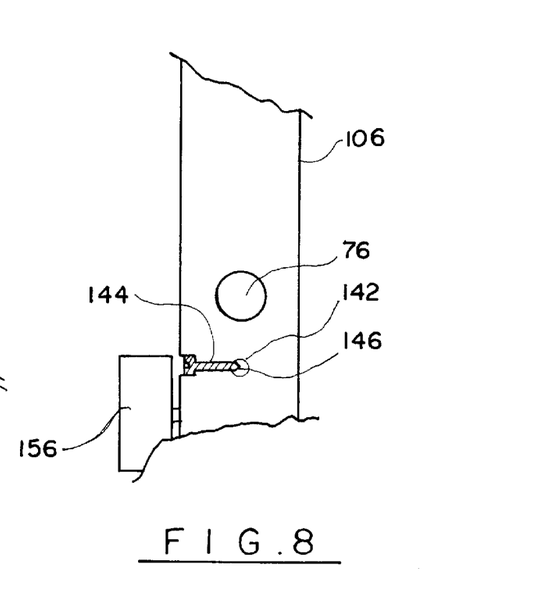
FIG. 8 is a detail view showing a needle valve as used in the device of the present invention.

The transverse portion 126 of the chamber 76 communicates with a gas inlet chamber 140 through a narrow passageway 142. The passageway 142 is provided with an adjustable needle valve 144 that can be better seen in FIG. 8. The needle valve 144 allows to regulate passage of gas admitted into the body 12 prior to its entrance into the chamber 76. As can be seen in FIG. 8, the needle valve 144 can be a standard screw having a pointed end that extends into the passage.

The needle valve 144 does not completely close the passage 142 but rather decreases the diameter of the conduit through which the gas flows into the chamber 76. In this manner, the amount of gas travelling through the passage 142 can be regulated very accurately. A transverse passageway 150 (FIG. 2) leads from the chamber 140 to a cutout 152 formed in the lower part 18 of the body 12. A lever valve, or other isolation valve 154 is mounted in the passage 150 which has an operating knob, or lever 156 mounted on the exterior wall of the body 12 (see FIG. 1). The valve 154 regulates admission of gas from an exterior source of pressurized gas into the chamber 140 and then into the chamber 76. By turning the valve handle 156, the user can close the valve 154, thereby isolating the chamber 76 from the exterior pressure source.

An optional check valve 200 is mounted at the outlet of the chamber 140 adjacent to the passageway 142. The check valve 200, being a one-way valve, prevents gas from escaping back into the chamber 140 from the chamber 76. The check valve 200 also prevents gas from flowing from the chamber 76 back into the external independent gas source in those instances when the pressure of the gas source is less than that of the chamber 76. Additionally, the check valve 200 performs a safety function by preventing back-flow in those rare instances when the pressure of the gauge being checked and calibrated is greater than that of chamber 76 and of the external gas source. Under such conditions, noxious substances from the source being checked could potentially pass through the body 12 and escape outside thereof. A possible injury to the user may result. The check valve 200 prevents such an escape of dangerous substances.

The device of the present invention is designed to operate with an external gas source contained in a pressurized vessel 160 shown in phantom lines in the drawings. The container 160 is adapted for retaining pressurized gas, for example carbon dioxide, or any other gas considered safe for testing purposes. A container 160 is connected to the lower part 18 of the body 12 through engagement of the neck of the container 160 with threads 162 formed in the opening 152.

During operation, the user attaches one of the tubes 28 to a calibration master gauge and the other tube 28 to a gauge or other measuring device to be checked (not shown). The tubes 28 communicate with the variable pressure chamber 76, and therefore the pressure in the tubes 28 is identical to the pressure in the chamber 76. Consequently, if the pressure in the chamber 76 changes, it will be communicated to the two measuring devices through the tubes 28.

In order to prevent freezing of the pressurized gas exiting from the container 160, the present invention contemplates pre-pressurization of the chamber 76 with outside atmospheric air. This step allows a relatively warm outside air to mix with the gas admitted from the container 160 and prevents the gas from freezing within the chamber 76. This also minimizes the use of gas from container 160. Of course, it will be understood by those skilled in the art, that other means for warming up the variable pressure chamber 76, such as mechanical or electrical, can be employed. But the preferred method is to use only as much of the gas from container 160 as necessary, thereby providing good thermal characteristics.

Pre-pressurization is carried out by compressing the piston handle 32 and the handle 30 to move the pistons 50 and 54 within their respective chambers 52 and 56. When the piston handle 32 is moved back, outside air is pulled into the chamber 52 by the piston 50, at the same time admitting air into the chamber 56 due to movement of the piston 54 away from the check valve 72 and 62. Since the chambers 52 and 56 are not in communication with each other, the outside air cannot pass between the two chambers. When the piston handle 32 is moved toward the body 12, the check valves 62 and 72 prevent the captured air from moving away from the body 12. Instead, the pistons 50 and 54 push the trapped air into the passages 80 and 74 through the check valves 82 and 78 and into the chamber 76. The check valves 78 and 82 prevent the air trapped in the chamber 76 from moving back into the chambers 52 and 56.

Continued pumping of the piston handle 32 admits more warm air into the chamber 76 which increases pressure in the chamber. Eventually, manual pre-pressurization becomes difficult. In that case, the user can manually rotate the screw 64, moving the pin 66 into a contact with the valve 62 and forcing it open. The check valve 62 will remain open until the screw 64 is rotated in the opposite direction to relieve pressure on the check valve 62. With the check valve 62 open, the piston 50 is taken out of operation during the pre-pressurization period even though the piston 50 moves forward when the handle 32 is pushed toward the body 12. In that case, the air inside the chamber 52 is pushed through the check valve 62 to the exterior of the body 12. However, the smaller piston 54 continues to operate and, due to the presence of the check valve 78 continues to build up pressure in the chamber 56, and consequently, in the chamber 76. Since the check valve 78 is closed, the movement of piston 54 will pump air from the chamber 56 into the chamber 76.

After the optional step of pre-pressurization is completed, the gas cartridge 160 can be brought into the operation. The cartridge, or container 160 has been already secured to the lower portion 18 by engaging a neck of the cartridge with the threads 162, or by using a universal adapter, not shown, mounted between the threads 162 and the threads of the cartridge 160. It is preferred that the compressed gas in the cartridge 160 be in a liquid form, although it is not absolutely necessary.

When the user is ready to release the gas from the external gas source, such as the cartridge 160, the user turns the handle 156, opening the valve 154 and admitting compressed gas into the passage 150. The valve 154 can be a globe valve, a ball valve, or a lever valve. The admitted gas rapidly expands and flows into the chamber 140, through the check valve 200, and into the passageway 142. From there, the gas finds its way into the chamber 76 where it mixes with the previously admitted warm outside air. After the pressure within the chamber 76 has been raised to a desired level, the user closes the valve 154 by turning the valve knob 156. The pressure inside the chamber 76 can then be adjusted by manually rotating the vernier adjustment knob 98. Once the pressure has been adjusted to a desired level, the accuracy of the pressure gauge to be tested can be determined in relation to a known pressure in the master gauge.

The external gas source allows the user to obtain the pressure ranges of a considerably higher level as compared to conventional hand pump pressure calibrators. For example, if a conventional hand pump can create a pressure of 200 psi, the device of the present invention, by using an external source of pressurized fluid can create a pressure of over 2500 psi without any manual pumping. The liquified product typically produces a gas volume hundreds of times the volume of the liquid. Depending on ambient temperature, carbon dioxide will remain in liquid form under pressure of 830 psi or higher. As the pressure decreases, the liquid flashes to gas form. Once the pressure of at least 830 psi is reached in the container holding the carbon dioxide, this chemical substance will remain in a liquid form. Liquid nitrogen works in a similar manner, except that the critical pressure for this substance is about 2500 psi.

Because piston 90 is connected to the cylindrical sleeve 124 and to the threaded sleeve 92, the piston 90 will move relative to the screw 94 when the vernier adjustment knob 98 is turned. In a preferred embodiment of the present invention, the direction of the threads of the screw 94 is reversed in relation to the threads of the vernier adjustment knob 98, so that when the knob 96 is turned clockwise, the piston 90 moves toward the knob 98 decreasing the volume in chamber 76 and creating greater pressure within the chamber.

More clockwise rotation of the knob 98 causes creation of greater pressure within the chamber 76. When the threaded sleeve 92 abuts against the nut 100, the pressure regulating means 86 can move no further and the minimum volume and the maximum pressure has been achieved. When the knob 98 is turned counter clockwise, the piston 90 is forced to move away from the knob 98, increasing the volume within the chamber 76 and decreasing the pressure. When the piston 90 abuts against the wall of the chamber 76, the pressure regulating means is prevented from movement, and no further rotation of the knob 98 will result in movement of the piston 90. At that time, the maximum volume and minimum pressure has been attained.

The pressure in the chamber 76 can be adjusted up and down repeatedly by moving the pressure regulating means 86 within the chamber 76. The length of the sleeve 88 is such that when the threaded sleeve 92 abuts against the nut 100 at the minimum volume position, the O-ring 124 on the piston 90 has not moved into the passage 170 which houses the check valve 82. The screw 94 has a discrete length which prevents the screw 94 from touching the piston 90 when the threaded sleeve 92 abuts against the nut 100 at the minimum volume position.

When the test is complete, or at any time when necessary, the pressure within the chamber 76 is released through the vent valve 130, which can be a conventional valve of a screw type or a push type. When the vent valve 130 is moved downwardly, the gas can escape from the chamber 76 into the passage 134 and into the atmosphere.

The connecting tubes 28 are connected to the pressure outlet couplings 24 by conventional means, for example a two-piece ferrule (not shown) and the tubing nut 26 held onto the end of the respective tube 28 by a ferrule. The tubing nut 26 is connected to the coupling 24 in a fluid-tight engagement, sealing off the outside air and placing the tubing 28 in direct communication with the chamber 76. Once this connection is established and the pressure within the chamber 76 reaches the desired level, the calibration of a pressure gauge against a master gauge can be performed.

The check valves and isolation valves utilized in the device of the present invention can be conventional valves, adapted to operate at various temperature ranges and pressures. For example, conventional lever type valves can be used. The body 12 of the device 10 can be made from a strong material adapted to withstand high pressure. The various passageways are created by drilling openings in the body of the device, and check valves, plugs and nuts are fitted into the passageway.

Figure 9:
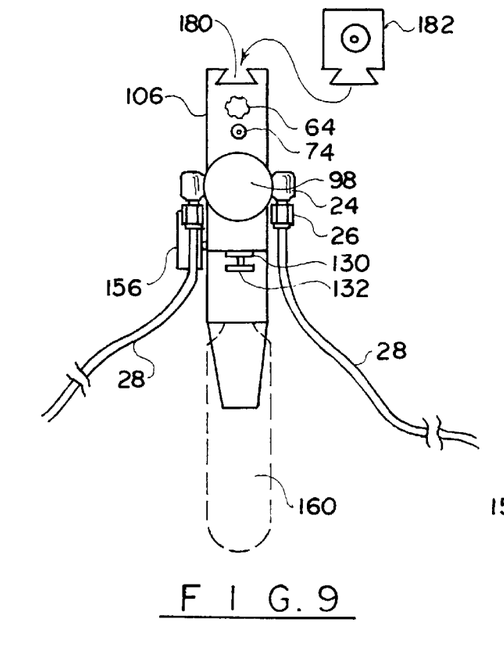
FIG. 9 is an end view of an alternative embodiment of the present invention showing a source of vacuum suitable for detachable connection to the gauge calibrating device.

In an optional embodiment of the present invention shown schematically in FIGS. 1 and 9, the device 10 is shown to comprise a slot 180 adapted to receive a vacuum module 182 therein. Creation of vacuum within an enclosed body is well known to those skilled in the art and forms no part of the present invention. The module 182 can be fitted with the body 12 in a manner shown in FIG. 2, with a calibration gauge schematically illustrated at 184. The vacuum module 182 can be easily detached from the body 12 by sliding it out of the slot 180 when not needed.

It is also envisioned that a water pump, instead of vacuum module 182 can be used for certain types of calibrations.

It is possible that some "freezing" may occur when liquid carbon dioxide or nitrogen are flashed into gas when entering the body 12. Therefore, a careful use of the liquefied substances is suggested, coupled with the admission of ambient air, in order to minimize thermal instability inside the body 12.

The device of the present invention can be used for calibration of a wide variety of measuring devices, pressure switches, flow switches, level switches, pressure transmitters, flow transmitters, level transmitters, as well as pressure level, and flow gauges, pressure relief valves and the like.

Various other changes and modifications can be made in the design of the present invention without departing from the spirit thereof. I, therefore, pray that my rights to the present invention be limited only by the scope of the appended claims.

I claim:

1. A pressure gauge calibrating device, comprising:

a calibrator body;

a means for connecting the calibrator body to an external source of pressurized fluid;

a variable pressure chamber formed in the calibrator body, said variable pressure chamber being in fluid communication with the external source of pressurized fluid;

a means mounted in said variable pressure chamber for regulating pressure buildup in the variable pressure chamber;

a means carried by said calibrator body connecting said variable pressure chamber to a master pressure gauge and to a device to be calibrated; and a means for pressurizing said variable pressure chamber with ambient air prior to admitting a pressurized fluid from the external source of pressurized fluid.

2. A pressure gauge calibrating device, comprising:

a calibrator body;

a means for connecting the calibrator body to an external source of pressurized fluid;

a variable pressure chamber formed in the calibrator body, said variable pressure chamber being in fluid communication with the external source of pressurized fluid;

a means mounted in said variable pressure chamber for regulating pressure buildup in the variable pressure chamber;

a means carried by said calibrator body connecting said variable pressure chamber to a master gauge and to a device to be calibrated;

a means for pressurizing said variable pressure chamber comprising a piston means movable within a piston chamber means, a first valve means mounted in said piston chamber means for admitting outside air into the piston chamber means and a second valve means mounted between said piston chamber means and said variable pressure chamber for transferring the admitted air into the variable pressure chamber, said piston means comprising a pair of piston members, each piston member sliding within a corresponding piston chamber, each of said piston chambers being in an independent fluid communication with the variable pressure chamber and with an exterior of said calibrator body, and wherein said piston members are mounted for coaxial simultaneous movement with each other on a piston arm extending between the piston members.

3. The device of claim 1, wherein said means for pressurizing said variable pressure chamber comprises at least one piston means movable within a piston chamber, a first valve means mounted in said piston chamber for admitting ambient air into the piston chamber, and a second valve means mounted between said piston chamber and said variable pressure chamber for transferring the admitted air into said variable pressure chamber.

4. The device of claim 1, wherein said means for pressurizing said variable pressure chamber comprises a piston means movable within a piston chamber means, a first valve means mounted in said piston chamber means for admitting ambient air into the piston chamber means and a second valve means mounted between said piston chamber means and said variable pressure chamber for transferring the admitted air into the variable pressure chamber.

5. The device of claim 3, further comprising means for moving said at least one piston means within said piston chamber.

6. The device of claim 5, wherein said piston moving means comprises a piston handle securely attached to said calibrator body and continuously urged away from said calibrator body by a compression spring.

7. The device of claim 1, wherein said pressure regulating means comprises an elongated sleeve provided with two open ends, and an insert mounted in each of said open ends, said sleeve being slidably movable within said variable pressure chamber in response to manipulation of an adjustment knob mounted on an exterior wall of said calibrated body.

8. The device of claim 7, wherein said adjustment knob carries an elongated screw, a free end of said screw threadably engaging one of the inserts mounted in an open end of said sleeve.

9. The device of claim 4, wherein said piston means comprises a pair of piston members, each piston member sliding within a corresponding piston chamber, each of said piston chambers being in an independent fluid communication with the variable pressure chamber and with an exterior of said calibrator body.

10. The device of claim 9, further comprising a means for moving said piston members.

11. The device of claim 10, wherein said means for moving the piston members comprises a handle securely connected to said calibrator body and continuously urged away from said calibrator body by compression spring.

12. The device of claim 11, wherein a portion of said handle extends into said calibrator body and is securely attached to one of said piston members.

13. A pressure gauge calibrating device, comprising:

a calibrator body;

a means for connecting the calibrator body to an external source of pressurized fluid, said means comprising a cutout formed in a lower portion of said calibrator body;

a variable pressure chamber formed in the calibrator body a distance away from said cutout, said variable pressure chamber being in fluid communication with the external source of pressurized fluid through a passageway extending from said cutout;

a means mounted in said variable pressure chamber for regulating pressure buildup in the variable pressure chamber, said pressure regulating means comprising an elongated sleeve provided with two open ends, an insert mounted in each of said open ends, said sleeve being slidably movable within said variable pressure chamber in response to manipulation of an adjustment knob mounted on an exterior wall of said calibrator body;

a means carried by said calibrator body for connecting said variable pressure chamber to a master pressure gauge and to a device to be calibrated; and a means for pre-pressurizing said variable pressure chamber, said pre-pressurization means comprising a pair of piston members, each piston member sliding within a corresponding piston chamber, each of said piston chambers being in independent fluid communication with a variable pressure chamber and with an exterior of the calibrator body, and wherein said piston members are mounted for coaxial simultaneous movement with each other on a piston arm extending between the piston members.

14. The device of claim 1, further comprising a ventilation valve mounted in fluid communication with the variable pressure chamber.

15. The device of claim 1, further comprising means for regulating admission of pressurized fluid into the calibrator body.

16. The device of claim 15, wherein said fluid regulating means comprises a regulating valve mounted in a fluid passageway of the calibrator body and a valve handle mounted on an exterior of the calibrator body.

17. A pressure gauge calibrating device, comprising:

a calibrator body;

a means for connecting the calibrator body to an external source of pressurized fluid, said means comprising a cutout formed in a lower portion of said calibrator body;

a variable pressure chamber formed in the calibrator body a distance away from said cutout, said variable pressure chamber being in fluid communication with the external source of pressurized fluid through a passageway extending from said cutout;

a means mounted in said variable pressure chamber for regulating said pressure buildup in the variable pressure chamber, said pressure regulating means comprising an elongated sleeve provided with two open ends and an insert mounted in each of said open ends, said sleeve being slidably movable within said variable pressure chamber in response to manipulation of an adjustment knob mounted on an exterior wall of said calibrator body;

a means carried by said calibrator body for connecting said variable pressure chamber to a master pressure gauge and to a device to be calibrated; and a means for pressurizing said variable pressure chamber with ambient air prior to admitting pressurized fluid from the external source of pressurized fluid comprising a pair of piston members, each piston member sliding within a corresponding piston chamber, each of said piston chambers being in independent fluid communication with the variable pressure chamber and with an exterior of the calibrator body.

18. The device of claim 17, further comprising means for regulating admission of pressurized fluid into the calibrator body, said fluid regulating means comprising a regulating valve mounted in a fluid passageway of the calibrator body and a valve handle mounted on an exterior of the calibrator body.

19. The device of claim 17, wherein each of said piston members is adapted for slidable movement within a corresponding piston chamber, sliding movement of each of said piston members admitting ambient air into the piston chambers.

20. The device of claim 19, further comprising a first valve means mounted in each of said piston chambers for admitting ambient air into the piston chambers and a second valve means mounted between each of said piston chambers and said variable pressure chamber for transferring the admitted air into the variable pressure chamber.

21. The device of claim 17, wherein said adjustment knob carries an elongated screw, a free end of said screw threadably engaging one of the inserts fitted in an open end of said sleeve.

22. The device of claim 17, further comprising a ventilation valve mounted for fluid communication with the variable pressure chamber.

* * * * *